United States Patent [19]

Robb

[11] Patent Number: 4,915,483

[45] Date of Patent: Apr. 10, 1990

[54] APOCHROMATIC LENS TRIPLETS WITH ASPHERICAL LENS ELEMENTS

[75] Inventor: Paul N. Robb, Sunnyvale, Calif.

[73] Assignee: Lockheed Missiles & Space Company, Inc., Sunnyvale, Calif.

[21] Appl. No.: 293,407

[22] Filed: Jan. 4, 1989

[51] Int. Cl.$^4$ .................... G02B 3/12; G02B 13/18
[52] U.S. Cl. ................................. 350/418; 350/432; 350/483
[58] Field of Search ............... 350/418, 419, 432–435, 350/479, 482, 483

[56] References Cited

U.S. PATENT DOCUMENTS

| 4,685,774 | 8/1987 | Moskovich | 350/418 X |
| 4,702,569 | 10/1987 | Mercado et al. | 350/479 |
| 4,838,665 | 6/1989 | Hasegawa et al. | 350/418 |

Primary Examiner—Scott J. Sugarman
Attorney, Agent, or Firm—John J. Morrissey

[57] ABSTRACT

An apochromatic lens triplet comprises a liquid lens element contained between two glass lens elements, where the two glass lens elements are geometrically identical to each other but face in opposite directions along an optic axis. Inwardly facing surfaces of the two glass lens elements, which are in contact with the liquid lens element, are spherical. Outwardly facing surfaces of the two glass lens elements are aspherical to optimize performance.

16 Claims, 6 Drawing Sheets

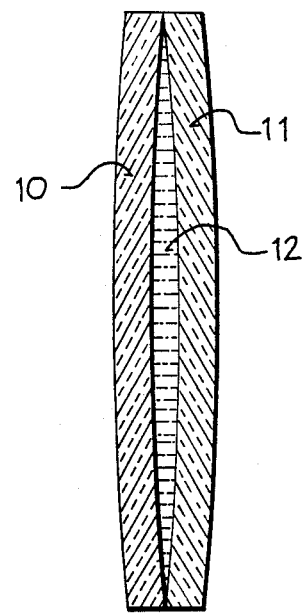
FIG_1
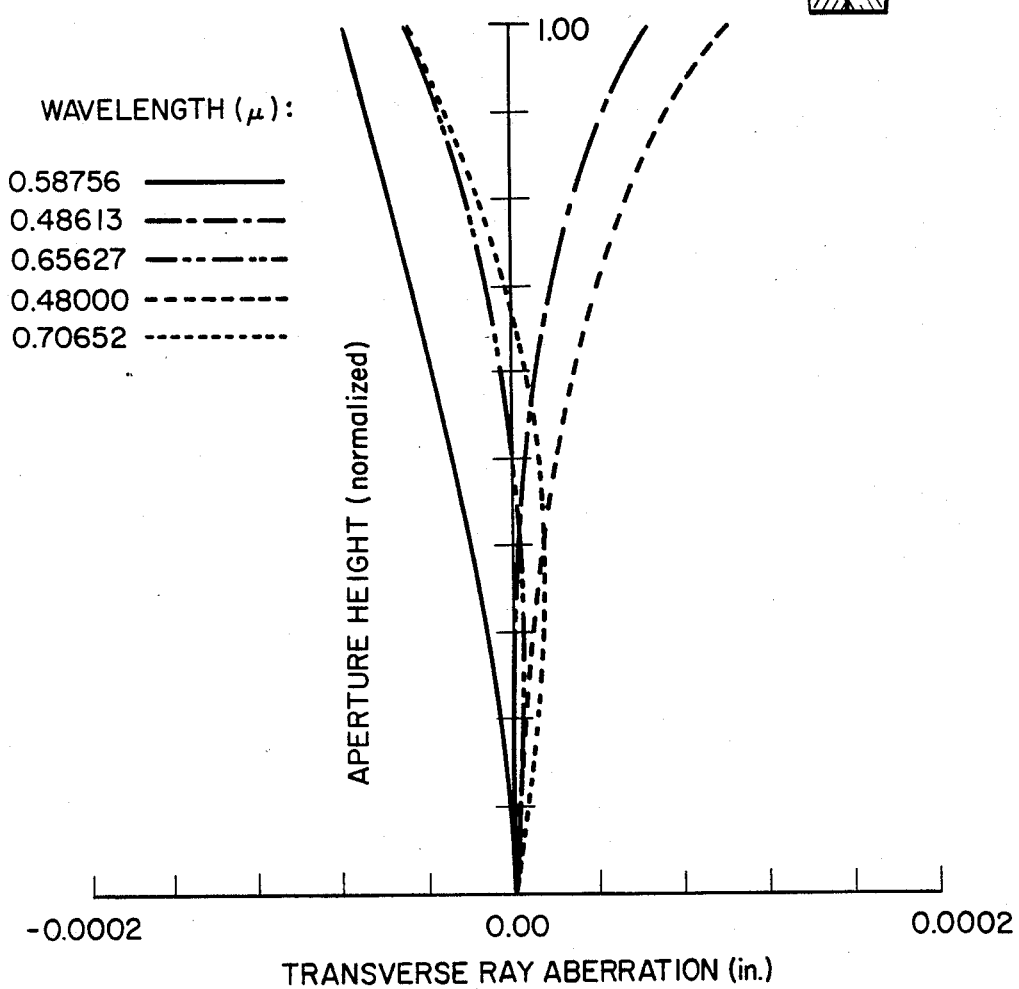
FIG_2

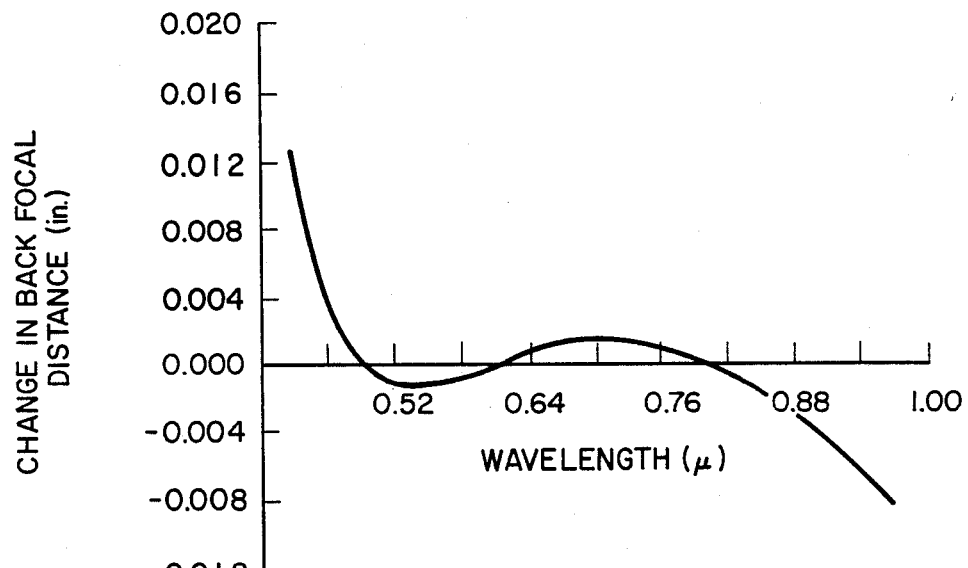
FIG_3
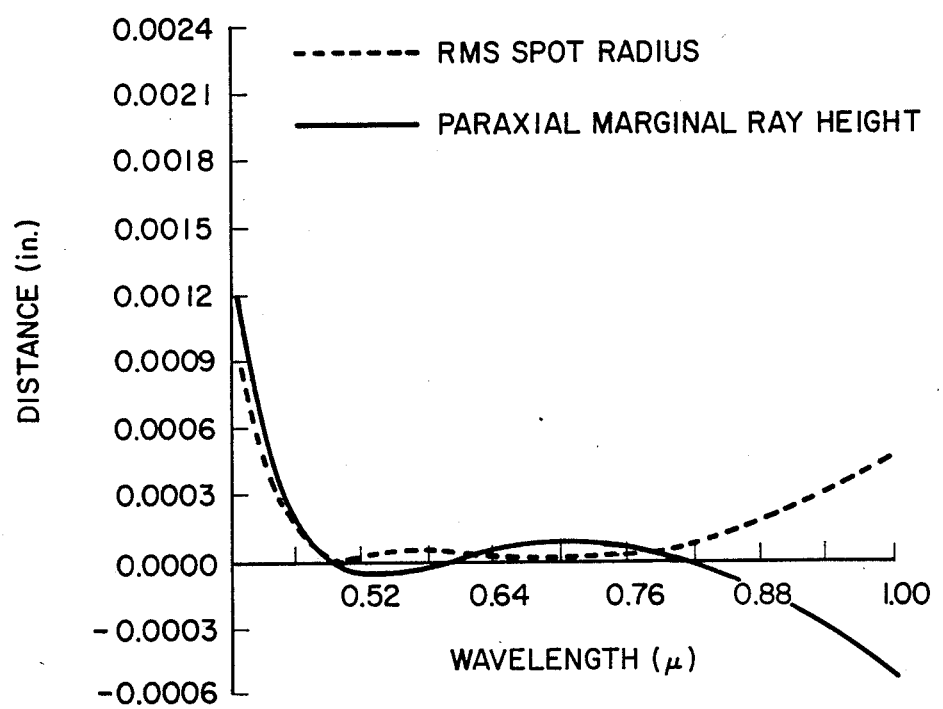
FIG_4

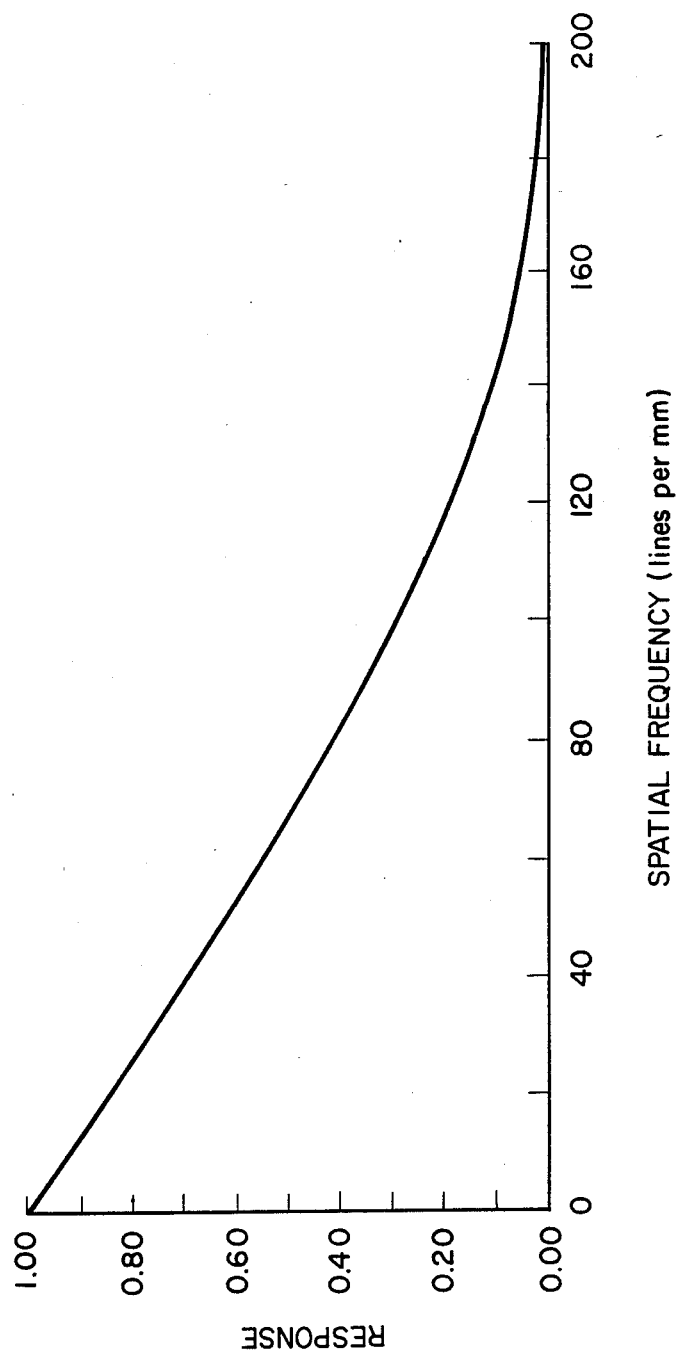
FIG_5

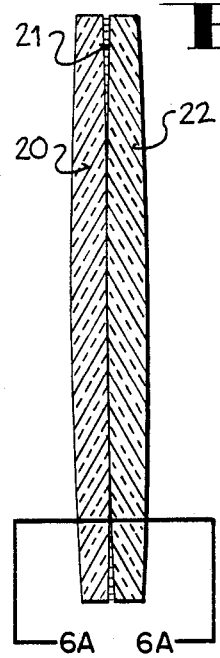
FIG_6
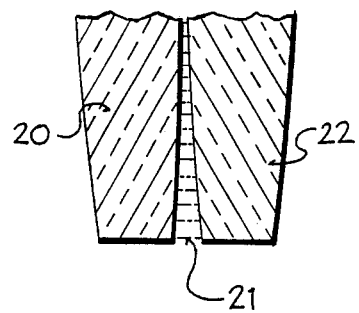
FIG_6A
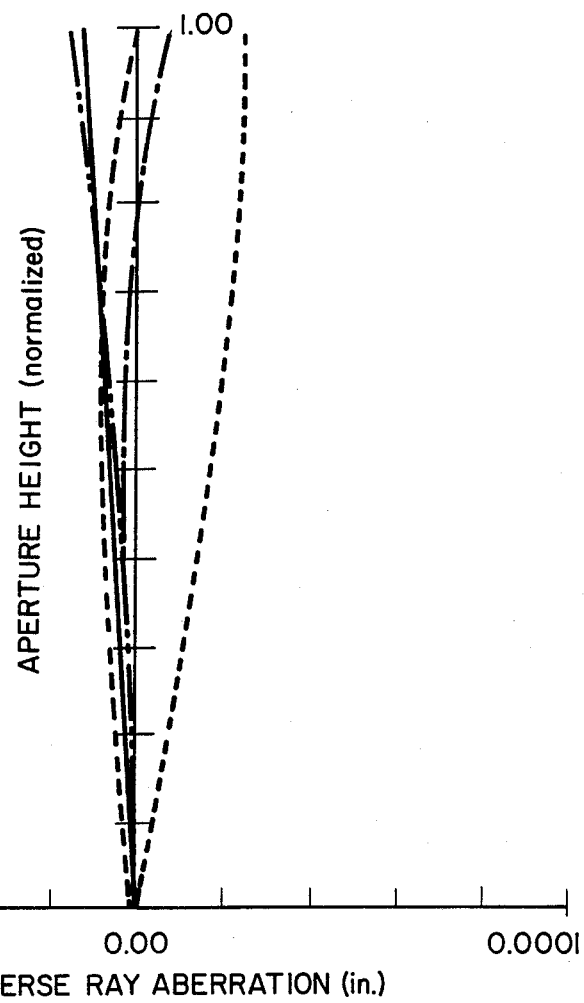
FIG_7

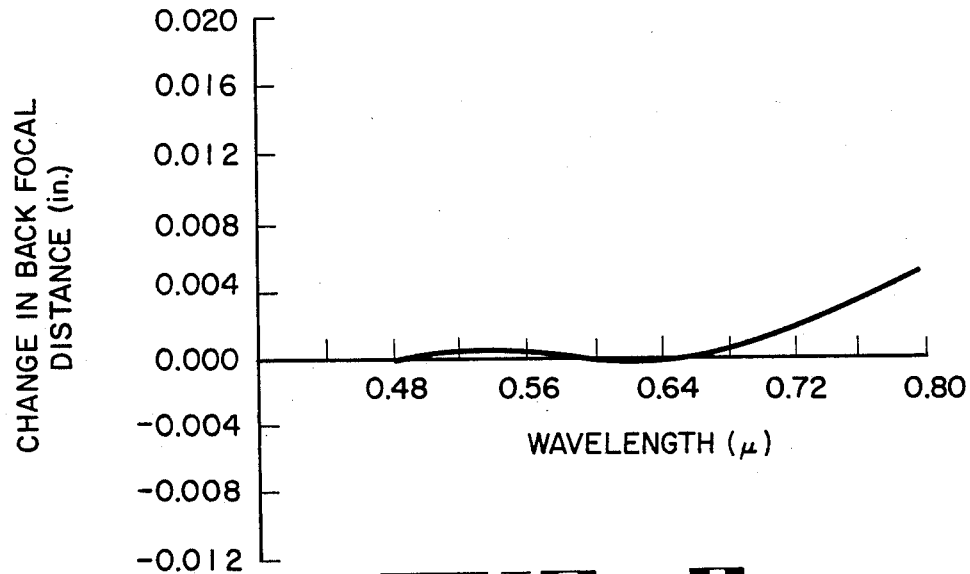
FIG_8
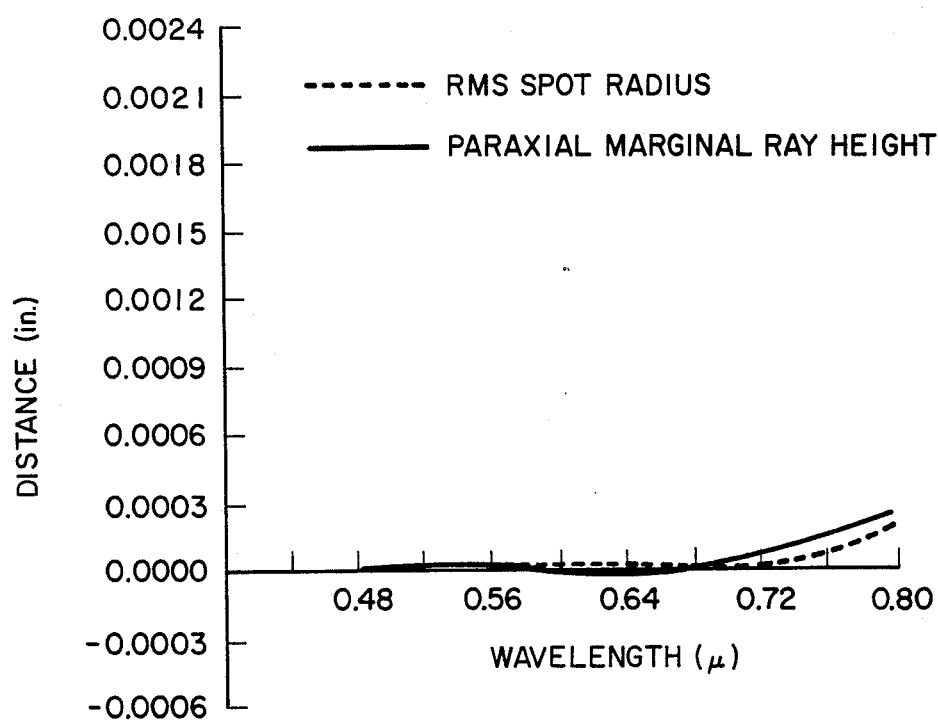
FIG_9

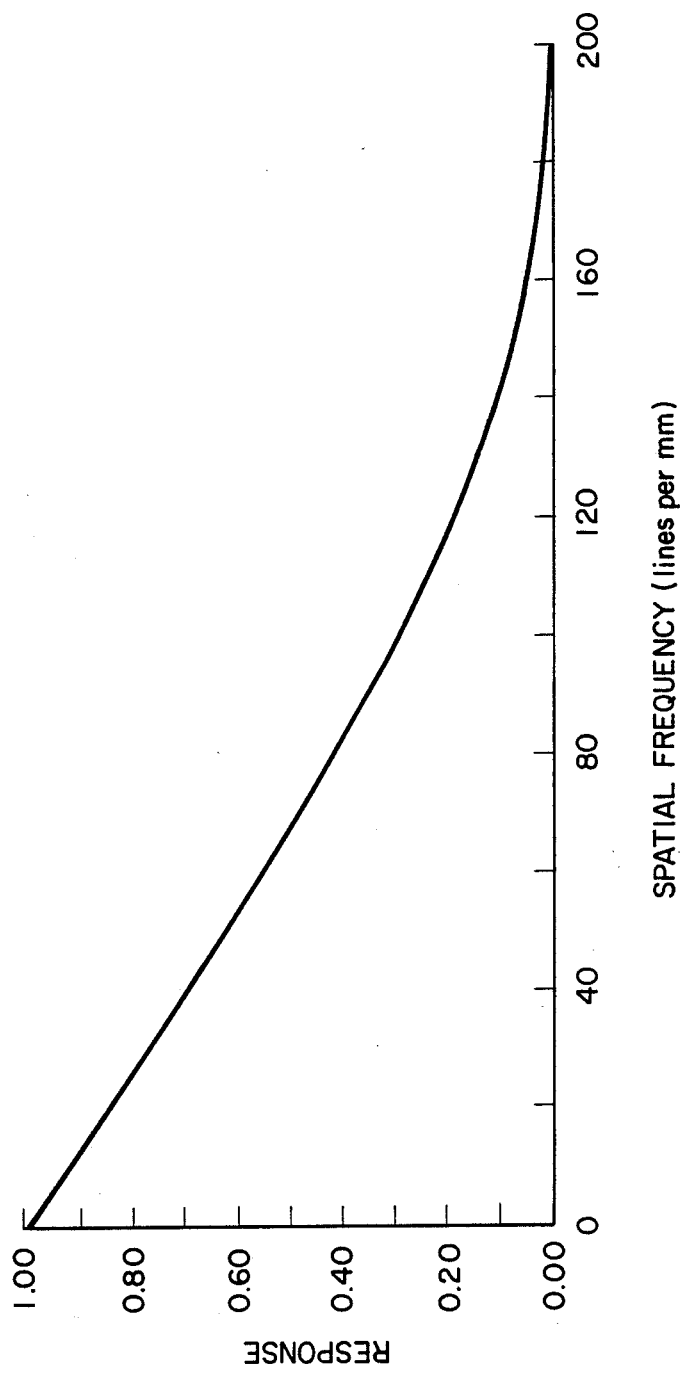

APOCHROMATIC LENS TRIPLETS WITH ASPHERICAL LENS ELEMENTS

TECHNICAL FIELD

This invention relates generally to apochromatic lens triplets of the type in which a fluidal liquid lens element is contained between two identical rigid lens elements, and more particularly to a technique for optimizing performance of such a lens triplet by providing aspherical lens surfaces.

BACKGROUND OF THE INVENTION

In co-pending U.S. patent application Ser. No. 419,705 filed on Sept. 20, 1982, a technique was disclosed that enables an optical designer to select compatible optical materials for the refractive elements of an optical system that is to be color-corrected at a specified number of wavelengths. A technique disclosed in co-pending U.S. patent application Ser. No. 260,106, filed on Oct. 20, 1988, enables the designer of a lens system that is to be color-corrected at a specified number of wavelengths to include one or more liquid lens elements among the lens elements of the system.

In co-pending U.S. patent application Ser. No. 282,665 filed on Dec. 12, 1988, particular examples were disclosed of apochromatic lens triplets of a type in which a liquid lens element is contained between two coaxially positioned and geometrically identical glass lens elements facing in opposite directions. The advantage of a lens triplet design in which a liquid lens element is contained between two identical glass lens elements becomes especially significant for mass-production manufacturing.

For the apochromatic lens triplets disclosed in the aforementioned U.S. patent application Ser. No. 282,665, both surfaces on each of the two glass lens elements of each lens triplet are spherical. Surface sphericity of lens surfaces is highly desirable in an optical prescription for glass lens elements, because the process of grinding (or chemically etching) and polishing a glass lens surface to a specified aspherical configuration is more complex (and hence more costly) than the process of producing a spherical lens surface. In general, there is no incentive in the optical design art to use an aspherical lens surface instead of a spherical lens surface, unless a significant performance advantage inherent in a particular aspherical surface is known beforehand that would compensate for the complexity and cost of producing the aspherical surface.

SUMMARY OF THE INVENTION

It is an object of the present invention to provide an apochromatic lens triplet consisting of a fluidal liquid lens element confined between two identical rigid lens elements, where performance of the lens triplet is optimized by providing aspherical lens surfaces.

The aspherizing of lens surfaces is a well-known design expedient for improving performance of a lens system with respect to the monochromatic aberrations, particularly spherical aberration. However, the aspherizing of lens surfaces has heretofore been a practicable expedient only for lens systems designed to operate at a single wavelength or over a very narrow wavelength band. For a lens system that is to be operated over a broad wavelength band (e.g., the visible spectrum), the aspherizing of a lens surface introduces chromatic variation of the monochromatic aberrations, especially chromatic variation of spherical aberration, which ordinarily causes a significant degradation in performance. In general, the degradation in performance attributable to the chromatic variation of spherical aberration introduced by aspherizing one or more lens surfaces of a lens system substantially nullifies any improvement in performance that might be achieved by correcting for spherical aberration.

A lens triplet according to the present invention is designed using two different optical materials, which are selected so that axial chromatic aberration at three wavelengths can be achieved and so that chromatic variation of third-order spherical aberration is substantially negligible. The two optical materials selected include a rigid material (e.g., an optical glass) and a fluidal liquid material (e.g., an immersion oil), whereby the lens triplet can be designed to comprise a fluidal liquid lens element confined between two rigid lens elements. The rigid lens elements are initially designed to have spherical surfaces according to an optical prescription (i.e., design form) that results in three-color correction (i.e., apochromatization) of the lens triplet. Then, one of the surfaces of each lens element is aspherized to improve performance with respect to spherical aberration. Since the design form of the lens triplet starts with substantially negligible chromatic variation of spherical aberration because of the judicious selection of optical materials, any degradation in chromatic variation of spherical aberration resulting from the subsequent step of aspherizing the lens surfaces is correspondingly negligible. Consequently, because of the choice of optical materials, aspherizing of the lens surfaces provides a significant improvement in performance of the lens triplet.

To optimize performance of a lens triplet in accordance with the present invention, it is not necessarily required that one surface of each rigid lens element be aspherical. In particular embodiments of the invention, one or both surfaces of both rigid lens elements could be aspherized. In other embodiments, one or both surfaces of only one rigid lens element could be aspherized. Where one or more surfaces on both rigid lens elements are aspherized, it is not necessary according to the present invention that corresponding lens surfaces have identical asphericities. However, especially for manufacturing operations conducted on a mass-production scale, it is economically advantageous for both rigid lens elements to be identical in all respects -- including surface asphericity.

DESCRIPTION OF THE DRAWING

FIG. 1 is a profile drawing of an apochromatic lens triplet having a focal length of 10 inches and a focal ratio of f/10, which consists of a liquid lens element contained between two identical glass lens elements, where the outwardly facing surfaces of the two glass lens elements are ellipsoidal in accordance with the present invention.

FIG. 2 is a plot of transverse ray aberration versus aperture height at five different wavelengths for the apochromatic lens triplet of FIG. 1.

FIG. 3 is a plot of change in back focal distance versus wavelength for the apochromatic lens triplet of FIG. 1.

FIG. 4 is a combined plot of paraxial marginal ray height versus wavelength and root-mean-square spot radius versus wavelength for the apochromatic lens triplet of FIG. 1.

FIG. 5 is a plot of the polychromatic modulation transfer function for on-axis rays at the wavelengths indicated in FIG. 2 for the apochromatic lens triplet of FIG. 1, which substantially coincides with a plot on the same scale of the polychromatic modulation transfer function for on-axis rays at the same wavelengths for a diffraction-limited aberration-free optical system having the same aperture diameter and focal ratio.

FIG. 6 is a profile drawing of an apochromatic lens triplet having a focal length of 10 inches and a focal ratio of f/10, which consists of a liquid lens element contained between two identical glass lens elements, where the outwardly facing surfaces of the two glass lens elements are hyperboloidal in accordance with the present invention.

FIG. 6A is an enlarged view of a peripheral portion of the apochromatic lens triplet of FIG. 6.

FIG. 7 is a plot of transverse ray aberration versus aperture height at five different wavelengths for the apochromatic lens triplet of FIG. 6.

FIG. 8 is a plot of change in back focal distance versus wavelength for the apochromatic lens triplet of FIG. 6.

FIG. 9 is a combined plot of paraxial marginal ray height versus wavelength and root-mean-square spot radius versus wavelength for the apochromatic lens triplet of FIG. 6.

FIG. 10 is a plot of the polychromatic modulation transfer function for on-axis rays at the wavelengths indicated in FIG. 7 for the apochromatic lens triplet of FIG. 6, which substantially coincides with a plot on the same scale of the polychromatic modulation transfer function for on-axis rays at the same wavelengths for a diffraction-limited aberration-free optical system having the same aperture diameter and focal ratio.

BEST MODE OF CARRYING OUT THE INVENTION

As illustrated in FIG. 1, an apochromatic lens system according to the present invention is a triplet comprising three lens elements, viz., a glass lens element 10, a liquid lens element 11, and a glass lens element 12, which are disposed coaxially with respect to each other along an optic axis, and which are secured in a mounting device appropriate for the particular application. The lens triplet illustrated in FIG. 1 can be used as, e.g., a photographic objective. A technique for mounting the lens triplet FIG. 1 disclosed in the aforementioned U.S. patent application Ser. No. 260,106.

The lens elements 10 and 12 are geometrically identical to each other, and are both made of the same type of optical glass, viz., a readily available and relatively inexpensive glass marketed by Schott Optical Glass Inc. of Duryea, Pennsylvania under the catalog designation SF2. The glass lens elements 10 and 12 are oriented in opposite directions along the optic axis of the lens system, thereby presenting concave surfaces that face each other to define a cavity therebetween. The liquid lens element 11 consists of a relatively inexpensive optical liquid marketed by R. L. Cargille Laboratories of Cedar Grove, New Jersey, which fills the cavity between the facing surfaces of the glass lens elements 10 and 12. The particular Cargille liquid used for the liquid lens element 11 is uniquely identified by the code number 478575 according to the U.S. Mil Spec system. The designation "478575" indicates the particular Cargille liquid whose index of refraction at the wavelength of the sodium D spectral line (i.e., 0.5893 micron) has the value 1.478 to the third decimal place, and whose Abbe number has the value 57.5 to the first decimal place.

The optical prescription for the apochromatic lens triplet shown in FIG. 1 is specified in tabular format for a 10-inch focal length and an f/10 focal ratio as follows:
t,0070
where the lens element surfaces are numbered consecutively from left to right in accordance with optical design convention. Surface No. 2 is common to the glass lens element 10 and to the liquid lens element 11, and surface No. 3 is common to the liquid lens element 11 and to the glass lens element 12. The "radius" listed for each surface is the radius of curvature of the surface (expressed in inches) at the optic axis. The radius of curvature of a surface is said to be positive if the center of curvature of the surface lies to the right of the surface, and negative if the center of curvature of the surface lies to the left of the surface. The inner surfaces No. 2 and No. 3 are spherical. However, the outer surfaces No. 1 and No. 4 are aspherical, namely, ellipsoidal with a conic constant of approximately −0.39.

The "thickness" listed for a given surface in Table I is the thickness of the lens element bounded on the left by the given surface, where the thickness of each lens element is measured in inches along the optic axis of the system. The lens diameter of the triplet is one inch, and the aperture stop is located at surface No. 1.

The column heading $N_d$ in Table I refers to the refractive index of the lens element bounded on the left by the indicated surface for the wavelength of the sodium d spectral line (i.e., for a base wavelength of 0.58756 micron). The column heading $V_d$ refers the Abbe number for the lens element bounded on the left by the indicated surface at the same base wavelength. The "material" listed for each surface in Table I refers to the type of optical material used for the lens element bounded on the left by the indicated surface. Thus the lens elements 10 and 12 are made of Schott SF2 glass, and the lens element 11 is made of Cargille 478575 liquid.

The Cargille liquid listed in Table I is identified by the code designation "478575", which specifies the particular liquid in terms of its index of refraction at the wavelength of the sodium D line. However, the values for refractive index listed in Table I for the Cargille 478575 liquid as well as for the Schott SF2 glass are the values at the wavelength of the sodium d line.

The shape of each of the ellipsoidal surfaces No. 1 and No. 4 is completely specified in terms of a local three-dimensional orthogonal (x,y,z) coordinate system by the equation:

$$z = C [\rho^2 + (k+1) z^2]/2; \quad (1)$$

where the vertex of the surface (i.e., the intersection of the surface with the optic axis) is located at (0,0,0), and the z axis (i.e., the axis of revolution of the surface) coincides with the optic axis; where $$\rho^2 = x^2 + y^2; \quad (2)$$

where C is the curvature of the surface at the vertex, as given by the equation:

$$C = 1/R, \quad (3)$$

where R is the radius of curvature of the surface; and where k is the conic constant that determines the classification of the surface according to a schema tabulated as follows:

Thus, the surfaces No. 1 and No. 4 of the lens triplet of FIG. 1 for which k = −0.39 are ellipsoidal about the optic axis of the lens triplet, and are specified by the equation:

$$z = C[\rho^2 + 0.61 z^2]/2. \qquad (4)$$

The refractive index of each of the optical materials of the lens triplet of FIG. 1 varies with wavelength. To evaluate the performance of the lens triplet of FIG. 1 at a number of different wavelengths, five wavelengths within the visible region of the electromagnetic spectrum were selected at which the refractive indices of the optical materials have the following values:
where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

A graphical indication of performance of a lens system is provided by a plot of transverse ray aberration versus aperture height. Plots of transverse ray aberration versus aperture height are given in FIG. 2 for each of the five wavelengths indicated in TABLE III. From the shape of the five plots shown in FIG. 2, it is apparent that spherical aberration has been substantially eliminated. The ellipsoidal shape of the outwardly facing surfaces No. 1 and No. 4 reduces spherical aberration to a negligible amount, so that performance of the lens triplet of FIG. 1 is limited only by chromatic variation of spherical aberration.

The aspherizing of optical surfaces in a lens system to correct for spherical aberration inherently increases chromatic variation of spherical aberration. However, the lens triplet design of FIG. 1, which initially has spherical surfaces as specified by the optical prescription of Table I, starts with a chromatic variation of spherical aberration that is substantially negligible, because the lens materials (Schott SF2 glass and Cargille 478575 liquid) are specially selected so that chromatic variation of spherical aberration is negligible. Consequently, since chromatic variation of spherical aberration is initially negligible, the increase in chromatic variation of spherical aberration introduced by the aspherizing of the surfaces No. 1 and No. 4 to correct for spherical aberration is practically insignificant.

The lens triplet illustrated in FIG. 1 has a diameter of one inch, a focal length of 10 inches, and the focal ratio is f/10. However, it is a feature of the present invention that the design form for the lens triplet illustrated in FIG. 1 can be scaled to lens diameters as large as 16 inches at a focal ratio of f/10 while maintaining a Strehl ratio of no less than 0.7.

FIG. 3 is a plot of change in back focal distance versus wavelength at the focal plane of the lens triplet illustrated in FIG. 1. The back focal distance of a lens system for a particular wavelength is defined as the distance along the optic axis of the system between the focal surface for that particular wavelength and the lens surface closest to that focal surface. The back focal distance for those wavelengths at which color correction has been achieved (i.e., for those wavelengths at which paraxial marginal rays passing through the system are brought to a common focus at the focal surface) can be considered as a "baseline" back focal distance for the system. The change in back focal distance from the "baseline" back focal distance as a function of wavelength provides an indication of the variation of axial chromatic aberration with respect to wavelength for the system.

The curve plotted in FIG. 3 indicates the chromatic variation in focal position along the optic axis of the lens triplet illustrated in FIG. 1, and is a measure of the axial chromatic aberration of the lens triplet. The three crossings of the horizontal axis by the curve plotted in FIG. 3 indicate that the lens triplet illustrated in FIG. 1 is color-corrected at three wavelengths (i.e., is an apochromat). Rayleigh's criterion for determining the amount of focal shift that can be tolerated for a wavefront passing through a lens system is that not more than one-quarter wavelength of optical path difference should occur over the wavefront relative to a reference sphere centered at a selected image point for the lens system. For a discussion of Rayleigh's criterion, see Warren Smith's text entitled *Modern Optical Engineering*, McGraw-Hill Book Company, Inc., 1966, page 297. The closeness of the curve shown in FIG. 3 to the horizontal axis throughout the wavelength range extending from approximately 0.47 micron to approximately 0.93 micron indicates that the apochromatic lens triplet of FIG. 1 can be used in that wavelength range without exceeding a depth-of-focus tolerance of one-quarter wavelength in accordance with Rayleigh's criterion.

In FIG. 4, paraxial marginal ray height and root-mean-square (RMS) spot radius are plotted as functions of wavelength for the apochromatic lens triplet of FIG. 1. The variation of paraxial marginal ray height with respect to wavelength on the image plane provides an indication of the extent to which the system is corrected for axial chromatic aberration. The curve for paraxial marginal ray height versus wavelength in FIG. 4 indicates that the lens triplet of FIG. 1, as well as being apochromatic, has practically insignificant secondary and higher-order chromatic aberration in the wavelength range from about 0.47 micron to about 0.93 micron.

The curve for RMS spot radius versus wavelength in FIG. 4 indicates that the RMS spot radius is nearly constant over the wavelength range from about 0.46 micron to about 0.88 micron, which is attributable to substantial elimination of spherical aberration because of the asphericity of the outer surfaces No. 1 and No. 4 of the lens triplet. The RMS spot radius is equal to or less than the radius of the Airy disc for the lens triplet of FIG. 1 over the wavelength range from about 0.45 micron to at least 1.00 micron. Thus, over this wavelength range, the lens triplet of FIG. 1 is diffraction limited for a 10-inch focal length and a focal ratio of f/10.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. In general, according to the principles of systems engineering, the performance of a system can be indicated by the ratio of the amplitude of the output to the amplitude of the input. This ratio is conventionally expressed as a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

In FIG. 5, the polychromatic modulation transfer function (i.e., response versus spatial frequency) is plotted for on-axis rays calculated for the five different wavelengths listed in Table III for the lens triplet of FIG. 1. The plot shown in FIG. 5 substantially coincides with a plot on the same scale of the polychromatic modulation transfer function for on-axis rays calculated for the same five wavelengths for an aberration-free optical system having the same aperture diameter and focal ratio as the lens triplet of FIG. 1. Thus, the lens triplet of FIG. 1 is seen to be substantially diffraction-limited.

Another apochromatic lens triplet with aspherical rigid lens element surfaces according to the present invention is illustrated in FIG. 6 in which a glass lens element 20, a liquid lens element 21, and a glass lens element 22 are disposed coaxially with respect to each other in an appropriate mounting device for use as, e.g., a photographic objective. The optical prescription for the lens triplet shown in FIG. 6 is specified in tabular format for a 10-inch focal length and an f/10 focal ratio as follows: t,0140
where the surfaces of the lens elements are numbered consecutively from left to right along the optic axis, and where the "radius", "thickness", "$N_d$", "$V_d$" and "material" for each of the lens surfaces are listed in accordance with the convention explained above in connection with Table I. The lens diameter of the triplet is one inch, and the aperture stop is located at surface No. 1. The inner surfaces No. 2 and No. 3 are spherical. However, the outer surfaces No. 1 and No. 4 are aspherical, namely, hyperboloidal with a conic constant of approximately −2.70.

The Cargille liquid listed in Table IV is identified by the code designation "850173", which specifies the particular liquid in terms of its index of refraction at the wavelength of the sodium D line. However, the values for refractive index listed in Table IV for the Cargille 850173 liquid as well as for the Schott SF2 glass are the values at the wavelength of the sodium d line.

The shape of each of the hyperboloidal surfaces No. 1 and No. 4 is completely specified by equation (1), where the values specified for the curvature C and the conic constant k reduce equation (1) to the form:

$$z = C[\rho^2 - 1.70 z^2]/2. \qquad (5)$$

The values of refractive index for the optical materials of the lens triplet of FIG. 6 at the same five wavelengths used to evaluate the performance of the lens triplet of FIG. 1 are given in tabular format as follows: t,0150
where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

The lens diameter of the triplet shown in FIG. 6 is one inch, and the thickness of the liquid lens element 21 at the optic axis is only 0.001 inch. The power of the liquid lens element 21 has been minimized so that its thickness at the periphery is only 0.007 inch. Thus, for practical purposes, the liquid lens element 21 can be considered as a mere film of liquid. Hence, optical absorptivity of the Cargille 850173 liquid forming the liquid lens element 21 is insignificant, because the total volume of liquid comprising the liquid lens element 21 is extremely small.

In FIG. 7, a plot of transverse ray aberration versus aperture height for the lens triplet of FIG. 6 is given for each of the five wavelengths indicated in Table V. The curves for the five different wavelengths shown in FIG. 7 indicate that the lens triplet of FIG. 6 exhibits a change in transverse ray aberration of less than 0.00002 inch over a wavelength range from 0.48 micron to 0.71 micron, which means that spherical aberration is virtually absent. The lens materials (Schott K5 glass and Cargille 850173 liquid) were selected so that chromatic variation of spherical aberration is initially negligible. Consequently, the increase in chromatic variation of spherical aberration introduced by the subsequent aspherizing of the surfaces No. 1 and No. 4 to correct for spherical aberration is practically insignificant.

FIG. 8 is a plot of change in back focal distance versus wavelength for the lens triplet shown in FIG. 6. As indicated by the three crossings of the horizontal axis by the curve shown in FIG. 8, the lens triplet of FIG. 6 is apochromatic and has practically insignificant secondary and higher-order chromatic aberration throughout the wavelength range from 0.48 micron to 0.93 micron. In fact, the lens triplet of FIG. 6 can be used without exceeding a depth-of-focus tolerance of one-quarter wavelength over the spectral range from 0.48 to 0.93 micron, which is in accordance with Rayleigh's criterion.

In FIG. 9, paraxial marginal ray height and RMS spot radius are plotted as functions of wavelength at the image plane for the apochromatic lens triplet of FIG. 6. The curve for paraxial marginal ray height versus wavelength in FIG. 9 is seen to have the same shape as the curve for change in back focal distance versus wavelength as shown in FIG. 8. The RMS spot radius is practically constant over the wavelength range from 0.48 micron to 0.80 micron, and is less than 5% of the Airy disc radius over that wavelength range. Thus, the lens triplet of FIG. 6 is diffraction limited at a focal ratio of f/10 for aperture diameters as large as 30 inches, and can be used without refocussing over the entire visible spectrum and well into the near-infrared spectrum.

In FIG. 10, the polychromatic modulation transfer function for the lens triplet of FIG. 6 is plotted for on-axis rays calculated for the five different wavelengths listed in Table V. The plot shown in FIG. 10 substantially coincides with a plot on the same scale of the polychromatic modulation transfer function for on-axis rays calculated for the same five wavelengths for an aberration-free optical system having the same aperture diameter and focal ratio as the lens triplet of FIG. 6. Thus, the lens triplet of FIG. 6 is seen to be substantially diffraction-limited.

The present invention has been described above in terms of particular embodiments. However, other embodiments within the scope of the invention would become apparent to practitioners skilled in the art of optical design upon perusal of the foregoing specification and accompanying drawing. Accordingly, the invention is defined more generally by the following claims and their equivalents.

I claim:

1. A lens system color-corrected at more than two wavelengths, said lens system comprising a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, a surface on each of said two rigid lens elements being aspherical, said two rigid lens elements and said fluidal liquid lens element coacting with each other to bring paraxial marginal rays passing through said lens system to a common focus at the wavelengths for which said lens system is color-corrected.

2. The lens system of claim 1 wherein another surface on each of said two rigid lens elements is substantially spherical, said two rigid lens elements being oriented on said optic axis so that the spherical surfaces of said two rigid lens elements face toward each other to define a space in which said fluidal liquid lens element is contained, and so that the aspherical surfaces of said two rigid lens elements face away from each other.

3. The lens system of claim 2 wherein said two rigid lens elements are made of an optical glass.

4. The lens system of claim 2 wherein said two rigid lens elements are made of an optical material having an index of refraction of approximately 1.648 and an Abbe number of approximately 33.85 at a base wavelength of the sodium D spectral line, and wherein said fluidal liquid lens element has an index of refraction of approximately 1.478 and an Abbe number of approximately 57.60 at said base wavelength.

5. The lens system of claim 4 wherein said two rigid lens elements are made of Schott SF2 glass, and wherein said fluidal liquid lens element consists of Cargille 478575 liquid.

6. The lens system of claim 5 wherein said lens elements are configured and positioned with respect to each other along said optic axis substantially as follows: t,0190
where surfaces No. 2 and No. 3 are spherical, and surfaces No. 1 and No. 4 are aspherical with a conic constant of approximately −0.39.

7. The lens system of claim 2 wherein said two rigid lens elements are made of an optical material having an index of refraction of approximately 1.522 and an Abbe number of approximately 59.48 at a base wavelength of the sodium D spectral line, and wherein said fluidal liquid lens element has an index of refraction of approximately 1.850 and an Abbe number of approximately 17.35 at said base wavelength.

8. The lens system of claim 7 wherein said two rigid lens elements are made of Schott K5 glass, and wherein said fluidal liquid lens element consists of Cargille 850173 liquid.

9. The lens system of claim 8 wherein said lens elements are configured and positioned with respect to each other along said optic axis substantially as follows: t,0200
where surfaces No. 2 and No. 3 are spherical, and surfaces No. 1 and No. 4 are aspherical with a conic constant of approximately −2.70.

10. An optical objective comprising a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, a surface on each of said two rigid lens elements being aspherical, said two rigid lens elements and said fluidal liquid lens element coacting with each other to focus optical radiation passing through said optical objective onto a focal surface with a change of focus of less than one-fourth wavelength over a wavelength range from approximately 0.47 micron to approximately 0.93 micron.

11. The optical objective of claim 10 wherein said two rigid lens elements are configured and positioned on said optic axis so as to bring paraxial marginal rays passing through said optical objective to a common focus at more than two wavelengths.

12. The optical objective of claim 10 wherein said two rigid lens elements are made of optical glass.

13. The optical objective of claim 10 wherein said fluidal liquid lens element is in contact with said two rigid lens elements.

14. A lens triplet consisting of a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, a surface on each of said two rigid lens elements being aspherical, said two rigid lens elements and said fluidal liquid lens element coacting with each other so that said lens triplet is corrected for axial chromatic aberration and has negligible spherical aberration and negligible chromatic variation of spherical aberration.

15. The lens triplet of claim 14 wherein said fluidal liquid lens element and said two rigid lens elements coact to form an image having a change in focus of less than one-quarter wavelength over a wavelength range extending from approximately 0.47 micron to approximately 0.93 micron.

16. The lens triplet of claim 14 wherein said fluidal liquid lens element and said two rigid lens elements coact to bring paraxial marginal rays passing therethrough to a common focus at more than two wavelengths.

* * * * *